(12) United States Patent
Zhou

(10) Patent No.: US 11,249,039 B2
(45) Date of Patent: Feb. 15, 2022

(54) METHOD OF MEASURING DEPTH OF DEFECTS IN LARGE-SCALE WIND TURBINE BLADE USING INFRARED THERMOGRAPHY

(71) Applicants: Shenyang University of Technology, Liaoning (CN); Shenyang Daxingcheng Energy Technology Co., Ltd, Liaoning (CN)

(72) Inventor: Bo Zhou, Liaoning (CN)

(73) Assignees: Shenyang University of Technology, Liaoning (CN); Shenyang Daxingcheng Energy Technology Co., Ltd, Liaoning (CN)

( * ) Notice: Subject to any disclaimer, the term of this patent is extended or adjusted under 35 U.S.C. 154(b) by 19 days.

(21) Appl. No.: 16/931,346

(22) Filed: Jul. 16, 2020

(65) Prior Publication Data

US 2021/0018454 A1     Jan. 21, 2021

(30) Foreign Application Priority Data

Jul. 19, 2019    (CN) .......................... 201910654483.X

(51) Int. Cl.
*G01N 25/72*      (2006.01)
*F03D 80/50*      (2016.01)
(Continued)

(52) U.S. Cl.
CPC ............. *G01N 25/72* (2013.01); *F03D 80/50* (2016.05); *G01B 9/02* (2013.01); *G01B 11/06* (2013.01);
(Continued)

(58) Field of Classification Search
CPC .................................................... G01N 25/72
(Continued)

(56) References Cited

U.S. PATENT DOCUMENTS

| 2011/0142091 A1* | 6/2011 | Wardle .................. G01N 25/72 374/45 |
| 2016/0274026 A1* | 9/2016 | Solheim .................. G01W 1/00 |

(Continued)

OTHER PUBLICATIONS

Manohar, Localization of Defects in Wind Turbine Blades and Defect Depth Estimation Using Infrared Thermography, Apr. 3, 2012, SPIE vol. 8345 (Year: 2012).*

*Primary Examiner* — Tarifur R Chowdhury
*Assistant Examiner* — Omar H Nixon
(74) *Attorney, Agent, or Firm* — Houtteman Law LLC

(57) ABSTRACT

The invention relates to the technical field of operation and maintenance of wind turbines, and is also applicable to non-destructive measurement of a depth of a defect of other resin-based composite materials. It is aimed at the problem that the depth of the defect cannot be determined by an intuitive infrared thermal image in the measurement of a depth of a defect of a large wind turbine blade. This method not only ensures accuracy of the measurement, but can also be widely applied. The method comprises the following steps: S1: continuously heating a surface of a wind turbine blade with an irradiation heat source; S2: collecting and storing a real-time heat map sequence of a surface of the blade with an NEC R300 infrared thermal imaging camera; S3: extracting a surface temperature rise curve at a defect location and organizing the results into a temperature rise curve family of the layers in a depth direction at the defect location; S4: extracting a surface temperature rise curve at a non-defect location, and calculating the similarity between the two temperature rise curve families; S5-S7: obtaining a reference depth value of the defect; and S8: determining whether the depth value is in a characteristic interval.

5 Claims, 3 Drawing Sheets

(51) Int. Cl.
 G01B 9/02 (2022.01)
 G01B 11/06 (2006.01)
 G01B 11/22 (2006.01)

(52) U.S. Cl.
 CPC .... G01B 11/22 (2013.01); *G06T 2207/10048* (2013.01)

(58) Field of Classification Search
 USPC ..................................................... 356/237.5
 See application file for complete search history.

(56) References Cited

U.S. PATENT DOCUMENTS

| | | | |
|---|---|---|---|
| 2018/0372487 A1* | 12/2018 | Irie ........................ | G01J 5/025 |
| 2019/0339209 A1* | 11/2019 | Du ......................... | G01N 21/95 |
| 2020/0011840 A1* | 1/2020 | Hafenrichter .......... | B62D 63/02 |
| 2020/0025176 A1* | 1/2020 | Georgeson .......... | G01M 5/0016 |
| 2020/0063717 A1* | 2/2020 | Georgeson ........... | G01N 29/225 |
| 2020/0166938 A1* | 5/2020 | Hafenrichter .......... | B64C 27/37 |

* cited by examiner

METHOD OF MEASURING DEPTH OF DEFECTS IN LARGE-SCALE WIND TURBINE BLADE USING INFRARED THERMOGRAPHY

TECHNICAL FIELD

The invention relates to the technical field of operation and maintenance of wind turbines, and is also applicable to non-destructive measurement of a depth of a defect of other resin-based composite materials.

BACKGROUND

Wind energy is an important renewable energy source. As a key component of wind turbines, wind turbine blades have an important impact on the safety and reliability of the entire unit. Large-scale wind turbine blades will inevitably form small defects in the process of processing and preparation. The main forms are delamination, pores, inclusions, wrinkles, etc. Due to the particularity of the composite material of wind power blades, which is a non-uniform medium, many internal defects cannot be detected. At present, the determination of the degree of blade damage basically depends on visual inspection by wind farm technicians and their experience, leading to low accuracy and late discovery of defects. Typically, a defect is already very serious upon discovery, resulting in high repair costs, a long repair cycle and great technical difficulties, and causing huge losses resulting from downtime. Therefore, it is of great significance to study the early defect detection technology of large-scale wind turbine blades in order to prolong the service life of the blades and reduce maintenance costs and losses resulting from downtime.

Under the effect of a sufficiently large alternating stress, internal defects that are not easy to detect may cause cracks due to stress concentration, and as the cracks expand, fracture and failure will occur suddenly, resulting in serious damage. Therefore, the realization of the internal defect detection of the blade is an important prerequisite for the early detection of the blade defect, and the depth of the defect is the key parameter for detecting the internal defect of the blade, because it can reflect the basic state of the internal defect and characterize the development trend of the internal defect. Therefore, it is very important to study the depth measurement technology of internal defects of large blades in order to realize the early detection of defects of large blades, prolong the service life of blades, reduce maintenance costs and shutdown losses.

Infrared detection has the characteristics of real-time detection, global detection, non-contact detection, etc., and has begun to be applied to the internal defect detection technology of large wind turbine blades. However, due to the large thickness of the wind turbine blade and the slow heating, the conventional offline detection method (a detection method in which data analysis if performed after the entire heating and cooling process is completed) consumes too much time and is too complicated in process, and the heating time needs to be calculated and set in advance, otherwise, it is impossible to ensure that the depth of deep defects can be identified. Even the depth of a shallow defect requires a long detection time. It is usually suitable for the testing of test pieces in the laboratory environment, but it does not meet the requirements of field detection, especially detection at a high altitude. There are also some infrared detection methods that use simplified and approximate processing depth calculation formulas. Although the calculation time is reduced to a certain extent, the accuracy is very low and the applicability is limited. Therefore, it is of great research significance and application value to research an infrared detection method that is fast, efficient, accurate, and can be applied to the deep defect depth detection of large wind turbine blades.

The invention proposes a method of measuring a depth of defects inside a large-scale wind turbine blade using infrared thermography, which obtains the depth information of the defect based on a differential equation of the heat transfer of the wind turbine blade, and self-corrects the defect calculation formula, the detection result is not limited by the thickness of the blade, and the accuracy is high, and it realizes synchronous operation of blade heating and real-time depth detection, which has a wide range of applicability.

SUMMARY OF THE INVENTION

The present invention is directed to the defects in the prior art, and provides a method of measuring a depth of an internal defect in a large-scale wind turbine blade using infrared thermography, which addresses the problem that the depth of defects in large-scale wind turbine blades cannot be determined through intuitive infrared thermal images. This method not only ensures accuracy of the measurement, but can also be widely applied.

To achieve the above objective, the present invention uses a technical solution below, including the following steps:

S1: continuously heating a surface of the wind turbine blade with an irradiation heat source;

S2: collecting and storing a real-time heat map sequence of the surface of the blade with an NEC R300 infrared thermal imaging camera;

S3: extracting a surface temperature rise curve U(t) at defect location, using formulas $$\frac{\partial U}{\partial t} = \alpha \frac{\partial^2 U}{\partial x^2}, \text{ and } \frac{U_j^{k+1} - U_j^k}{\tau} = \alpha \frac{U_{j+1}^k - 2U_j^k + U_{j-1}^k}{h^2}$$

to calculate a temperature value of a jth layer in a depth direction at the defect location at different times k $U_j^k$, and organizing the results into a temperature rise curve family for the layers in the depth direction at the defect location $U_j^t$;

S4: extracting a surface temperature rise curve S(t) at a non-defect location, and calculating similarity between S(t) and each curve of the curve family $U_j^t$, wherein the formula for calculating the similarity is $E_j = [\Sigma_{t=1,2,3}^{T} (S(t) - U_j^t)^2]^{(-1/2)}$, where T represents a maximum measurement time, Ej represents a similarity sequence, $U_j^t$ represents a temperature rise curve of the jth layer in the depth direction at the defect location, S(t) represents a temperature rise curve at the non-defect location, j=1, 2, . . . , n, and n is the number of the deepest layer defined;

S5: selecting j to which the maximum value corresponds in Ej, and according to formulas $X_1 = 2 \times j$ and $X_2 = 2 \times (j-1)$, obtaining a characteristic interval $[X_1, X_2]$;

S6: according to a formula $\Delta U(t) = U(t) - S(t)$, obtaining a temperature difference curve $\Delta U(t)$, and extracting a maximum value thereof $\Delta U_{max}$, to obtain the time $T_{max}$ to which $\Delta U_{max}$ corresponds;

S7: according to a formula $L' = \beta \sqrt{T_{max}}$, obtaining a defect reference depth value L', where β represents a depth coefficient related to blade material properties, which is obtained from measurement in a laboratory environment; and S8: determining whether L' is in within the characteristic interval $[X_1, X_2]$, if it is, L' is a defect depth L, and the calculation ends; if not, according to $\beta'=\alpha*\beta$, ($\alpha>1$) or $\beta'=\gamma*\beta$, ($0<\gamma<1$), $\beta$ is scaled until L' falls into the characteristic interval and an absolute distance from a boundary is less than $\varepsilon(\varepsilon=0.01)$, with $\beta'$ replacing the old $\beta$, returning to S7, and recalculating the defect depth L.

As a preferred solution of the present invention, in step S1, the heating device used for heating is a halogen lamp or a heating device for continuous irradiation.

As another preferred solution of the present invention, the detection parameter $\beta$ (a depth coefficient related to blade material properties) can be automatically adapted to changes of a detection object.

As another preferred solution of the present invention, the detection process S2-S8 occurs during the heating process.

As another preferred solution of the present invention, the measurement method is applicable to calculation of a depth of a deep defect without being limited by a thickness of the blade, and is applicable to detection of a depth of an internal defect of a resin-based composite material of any kind.

Compared with the prior art, the invention has beneficial effects.

The invention fills the gap of real-time measurement of the depth of internal defects of large wind turbine blades, and has the following apparent advantages:

1) High accuracy and wide application range: defect information is directly obtained by solving heat transfer differential equations, without approximate calculation and simplification, and the depth calculation formula is automatically corrected for different types of material characteristics, with higher accuracy and wider application range.

2) Real-time: taking the blade heating curve as the analysis object, the internal defect depth is detected in real time in synchronization with blade heating, with short time and high efficiency.

3) Suitable for the depth detection of deep defect for large blades: the invention is not limited by the thickness of the blade, and does not need to set an accurate detection time, which can ensure the detection of defects at any depth;

4) It can be extended to other composite material structures and devices to determine the depth of defects.

BRIEF DESCRIPTION OF DRAWINGS

The present invention will be further described below with reference to the drawings and specific embodiments. The scope of protection of the present invention is not limited to the following description.

DETAILED DESCRIPTION

The objects of this embodiment are fragments of a main beam of a certain wind turbine blade, with a total thickness of 30 mm, and a hole in the back cut by a milling machine to generate internal cavity defects with distances of 3 mm, 5 mm, and 7 mm from the surface, respectively. The method for measuring the depth of the internal defects of the blade in this embodiment is further described in detail below in conjunction with the drawings in the examples of the present invention.

The theory of the present invention is based on the one-dimensional heat conduction equation excited by a continuous heat source. When a semi-infinite uniform medium is subjected to a continuous heat source parallel to the surface, the heat conduction equation can be expressed as:

$$\frac{\partial U}{\partial t} = \alpha \frac{\partial^2 U}{\partial x^2} \qquad (1)$$

in the formula U is a surface temperature, t is time, $\alpha$ is a heat transfer coefficient, x is a depth.

Figure 1:
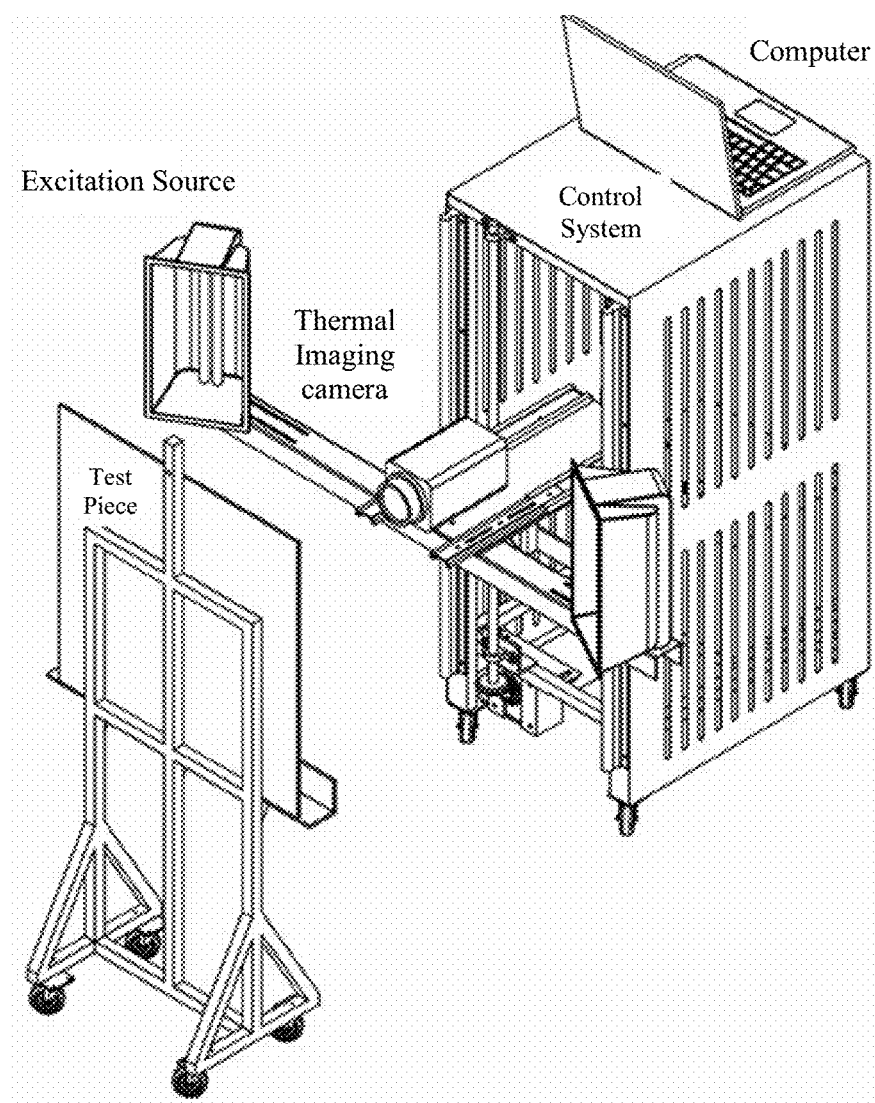
FIG. 1 is a schematic diagram of the continuous heating infrared defect depth detection technology.
Figure 2:
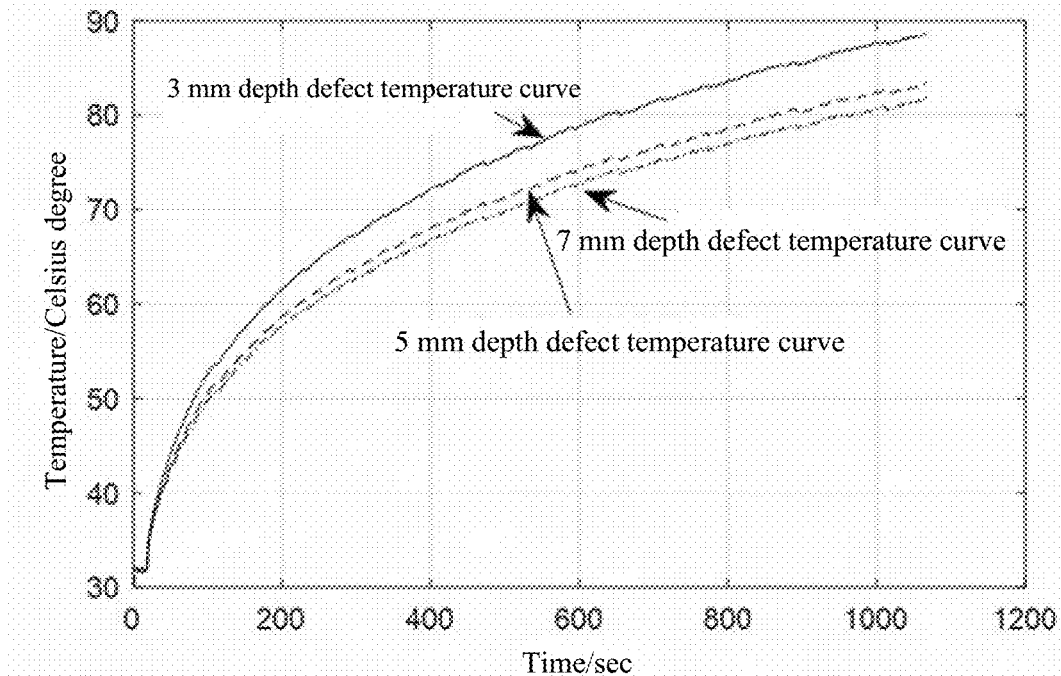
FIG. 2 is a temperature curve diagram of defects of different depths in a specific example of the present invention.

As shown in FIG. 1, a halogen lamp is used as an irradiation source to continuously heat the surface of the test piece, and heat is conducted from the surface of the test piece to internal defects in the depth direction. An infrared thermal imaging camera records the changes of the surface temperature field of the test piece in real time, and the computer is used to collect the surface thermal map data obtained by the infrared thermal imaging camera. When the heat enters defect areas with different internal heat transfer coefficients from the surface of the test piece, the transient flow of heat is blocked in whole or in part, causing the temperature to deviate from the defect areas. At this time, a change of the surface thermal image temperature T of the defect area of the test piece over time t is calculated with a formula as follows:

$$T(t) = \frac{Q}{e\sqrt{\pi t}} \left[ 1 + 2 \sum_{n=1}^{\infty} \exp\left(\frac{n^2 a^2}{at}\right) \right] \qquad (2)$$

where, Q is the heat absorbed by the surface of the test piece, e is a heat storage coefficient of the measured test piece, n is a natural number, and d is a depth of the defect. The temperature-time graph is shown in FIG. 2.

Extracting a surface temperature rise curve U(t) at defect location, using formulas $$\frac{\partial U}{\partial t} = \alpha \frac{\partial^2 U}{\partial x^2} \qquad (3)$$

and $$\frac{U_j^{k+1} - U_j^k}{\tau} = \alpha \frac{U_{j+1}^k - 2U_j^k + U_{j-1}^k}{h^2} \qquad (4)$$

to calculate a temperature value of a jth layer in a depth direction at the defect location at different times k $U_j^k$, and organizing the results into a temperature rise curve family for the layers in the depth direction at the defect location $U_j^t$.

Figure 3:
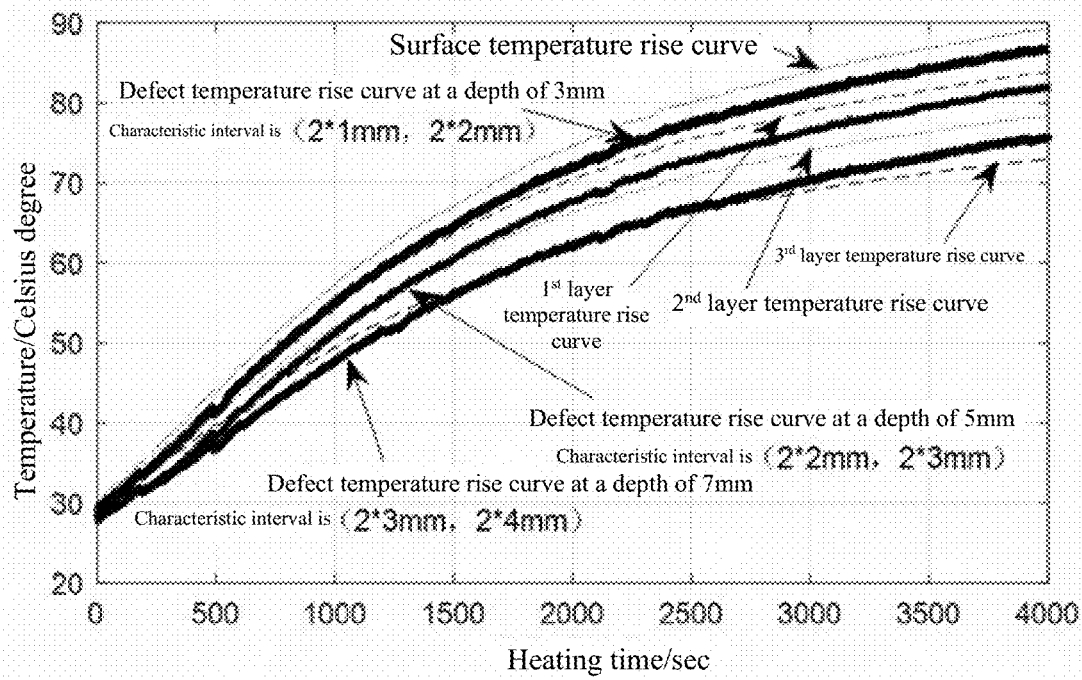
FIG. 3 is a schematic diagram of a calibration interval of a specific example of the present invention.

Extracting a surface temperature rise curve S(t) at a non-defect location, and calculating similarity between S(t)

and each curve of the curve family $U_j^t$. The formula for calculating similarity is:

$$E_j = \left[ \sum_{t=1,2,3...}^{T} (S(t) - U_j^t)^2 \right]^{(-\frac{1}{2})} \quad (5)$$

in which T represents a maximum measurement time, $E_j$ represents a similarity sequence, $U_j^t$ represents a temperature rise curve of the jth layer in the depth direction at the defect location, S(t) represents a temperature rise curve at the non-defect location, j=1, 2, ..., n, and n is the number of the deepest layer defined;

in similarity sequence $E_j$, selecting j to which the maximum value corresponds, and according to formulas $$X_1 = 2 \times j \quad (6)$$

$$X_2 = 2 \times (j-1) \quad (7)$$

obtaining a characteristic interval $[X_1, X_2]$. FIG. 3 is a schematic diagram of solving the characteristic interval.

Figure 4:
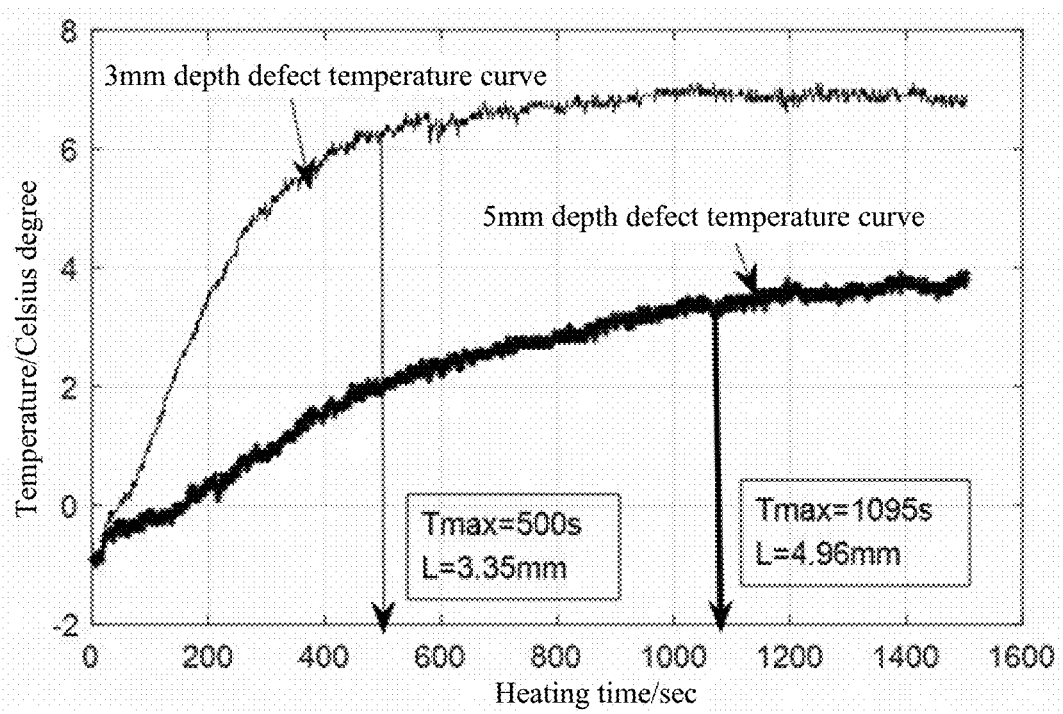
FIG. 4 is a schematic diagram for obtaining the time of the maximum temperature difference at different defect depths in a specific example of the present invention.

According to a formula $$\Delta U(t) = U(t) - S(t) \quad (8)$$

obtaining a temperature difference curve U(t), and extracting a maximum value thereof $\Delta U_{max}$, to obtain $\Delta U_{max}$, the time $T_{max}$ to which corresponds to. FIG. 4 is a diagram of the principle for acquiring $T_{max}$.

According to a formula $$L' = \beta \sqrt{T_{max}} \quad (9)$$

obtaining a defect reference depth value L', where β represents a depth coefficient related to a thermal property of the blade material, which is obtained from measurement in a laboratory environment.

Figure 5:
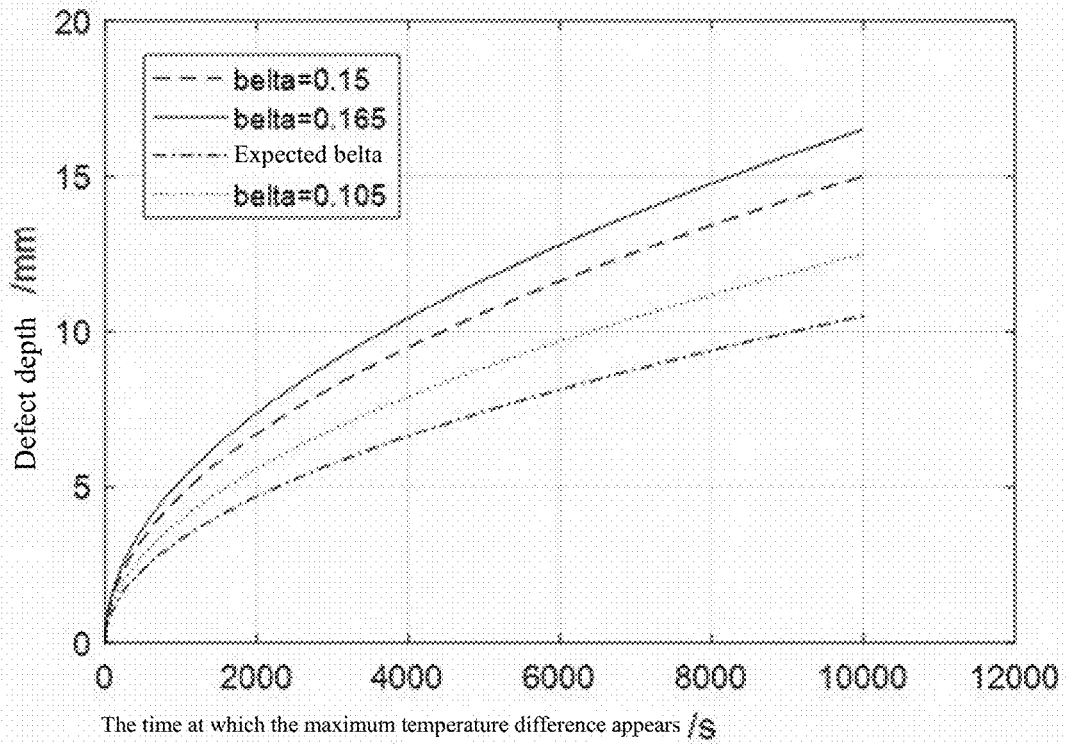
FIG. 5 is a diagram of correction of a defect calculation coefficient of a specific example of the present invention.

Next, determine whether L' is in within the characteristic interval $[X_1, X_2]$, that is, whether it is satisfied that $X_1 < L' < X_2$, if it is, L' is a defect depth L, and the calculation ends. If not, according to $$\beta' = \alpha * \beta, (\alpha > 1) \quad (10)$$

or $$\beta' = \gamma * \beta, (0 < \gamma < 1) \quad (11)$$

the β is scaled until L' falls into the characteristic interval and an absolute distance from a boundary is less than ε (ε=0.01), with β' replacing the old β, recalculating the defect depth L. FIG. 5 is a schematic diagram of a calibration process for β.

TABLE 1

Measurement accuracy statistics

| Defect depth | 3 mm | 5 mm | 7 mm |
|---|---|---|---|
| Measured depth | 3.12 mm | 5.19 mm | 6.7 mm |
| Measurement accuracy | 4% | 3.8% | 4.3% |
| Measurement time | 400 s | 1000 s | 2100 s |

The measurement results of the implementation case of the present invention show that the depth measurement error processed by this method is very small. The measurement process is performed online and real-time without setting a detection time, and can complete the depth detection of defects at any depth.

It can be understood that the above specific description of the present invention is only used to illustrate the present invention and is not limited to the technical solutions described in the embodiments of the present invention. Those of ordinary skill in the art should understand that the present invention can still be modified or equivalent replacement can be made to achieve the same technical effect; as long as it meets the use requirements, it is within the protection scope of the present invention.

The invention claimed is:

1. A method of measuring a depth of an internal defect of a large-scale wind turbine blade using infrared thermography, characterized by comprising steps of:
   S1: continuously heating a surface of the wind turbine blade with an irradiation heat source;
   S2: collecting and storing a real-time heat map sequence of the surface of the blade with an NEC R300 infrared thermal imaging camera;
   S3: extracting a surface temperature rise curve U(t) at defect location, using formulas $$\frac{\partial U}{\partial t} = \alpha \frac{\partial^2 U}{\partial x^2}, \text{ and } \frac{U_j^{k+1} - U_j^k}{\tau} = \alpha \frac{U_{j+1}^k - 2U_j^k + U_{j-1}^k}{h^2}$$

to calculate a temperature value of a jth layer in a depth direction at the defect location at different times $kU_j^k$, and organizing the results into a temperature rise curve family for the layers in the depth direction at the defect location $U_j^t$, wherein U denotes the surface temperature of defect area, t denotes the heating time, x denotes the coordinate in the thickness direction, a is the thermal diffusion coefficient, T Represents unit time and h represents space step;

S4: extracting a surface temperature rise curve S(t) at a non-defect location, and calculating similarity between S(t) and each curve of the curve family $U_j^t$, wherein the formula for calculating the similarity is $E_j = [\Sigma_{t=1,2,3} \ldots {}^T (S(t) - U_j^t)^2]^{(-1/2)}$, where T represents a maximum measurement time, Ej represents a similarity sequence, $U_j^t$ represents a temperature rise curve of the jth layer in the depth direction at the defect location, S(t) represents a temperature rise curve at the non-defect location, j=1, 2, ..., n, and n is the number of the deepest layer defined;
   S5: selecting j to which the maximum value corresponds in Ej, and according to formulas $X_1 = 2 \times j$ and $X_2 = 2 \times (j-1)$, obtaining a characteristic interval $[X_1, X_2]$;
   S6: according to a formula $\Delta U(t) = U(t) - S(t)$, obtaining a temperature difference curve $\Delta U(t)$, and extracting a maximum value thereof $\Delta U_{max}$, to obtain the time $T_{max}$ to which $\Delta U_{max}$ corresponds;
   S7: according to a formula $L' = \beta \sqrt{T_{max}}$, obtaining a defect reference depth value L', where β represents a depth coefficient related to blade material properties, which is obtained from measurement in a laboratory environment; and
   S8: determining whether L' is in within the characteristic interval $[X_1, X_2]$, if it is, L' is a defect depth L, and the calculation ends; if not, according to $\beta' = \alpha * \beta, (\alpha > 1)$ or $\beta' = \gamma * \beta, (0 < \gamma < 1)$, β is scaled until L' falls into the characteristic interval and an absolute distance from a boundary is less than ε(ε=0.01), with β' replacing the old β, returning to S7, and recalculating the defect depth L.

2. The method of measuring a depth of an internal defect of a large-scale wind turbine blade using infrared thermography according to claim 1, characterized in that in step S1, a heating device used for heating is a halogen lamp or a heating device for continuous irradiation.

3. The method of measuring a depth of an internal defect of a large-scale wind turbine blade using infrared thermography according to claim 1, characterized in that the detecting parameter $\beta$ can be automatically adapted to changes of a detection object.

4. The method of measuring a depth of an internal defect of a large-scale wind turbine blade using infrared thermography according to claim 1, characterized in that the detection process S2-S8 occurs during the heating process.

5. The method of measuring a depth of an internal defect of a large-scale wind turbine blade using infrared thermography according to claim 1, characterized in that the measurement method is applicable to calculation of a depth of a deep defect without being limited by a thickness of the blade, and is applicable to detection of a depth of an internal defect of a resin-based composite material of any kind.

* * * * *